Feb. 19, 1963  J. K. BECKETT  3,077,930
METHOD FOR FRACTURING A SUBSURFACE FORMATION
Filed May 27, 1959
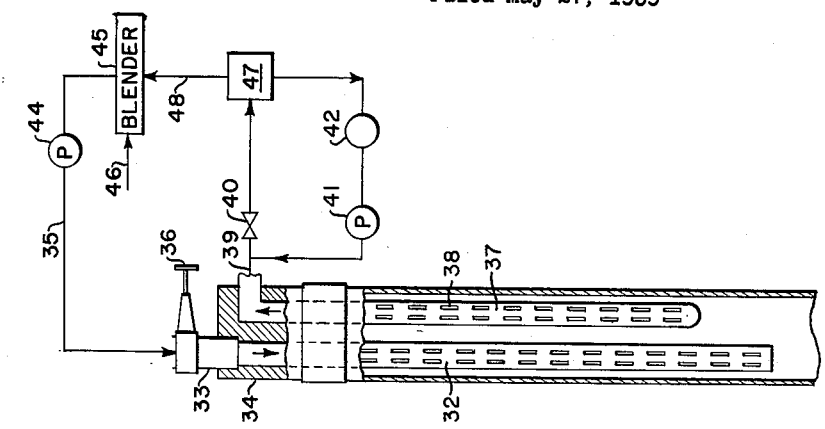
FIG. 3
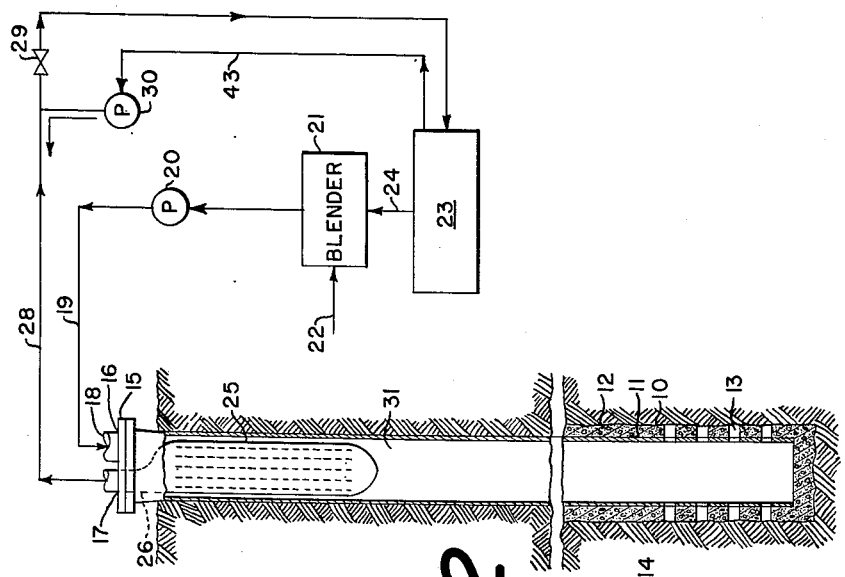
FIG. 1
FIG. 2
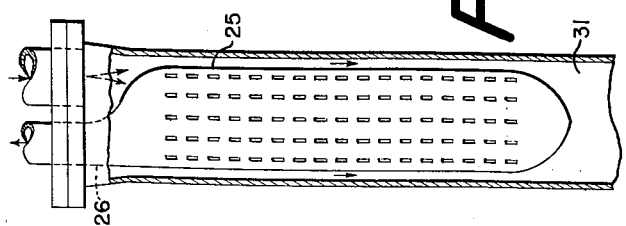
INVENTOR.
JOSEPH K. BECKETT
BY
ATTORNEY

United States Patent Office 3,077,930
Patented Feb. 19, 1963

3,077,930
METHOD FOR FRACTURING A SUBSURFACE
FORMATION
Joseph K. Beckett, Yorba Linda, Calif., assignor to Western Gulf Oil Company, Los Angeles, Calif., a corporation of Delaware
Filed May 27, 1959, Ser. No. 816,306
2 Claims. (Cl. 166—42)

This invention relates to means and method for completing a well and more particularly to means and method for hydraulically fracturing an earth formation penetrated by a well bore with a fracturing fluid containing a granular solid propping agent.

As is known, hydraulic fracturing methods are employed to create artificial fractures adjacent to a producing formation such as an oil formation to increase the productivity of the formation. In general, such methods consist in forcing a low-penetrating fluid such as a hydrocarbon oil gel into the formation in sufficient volume and under sufficient pressure to rupture the formation. After the injection pressure is released and the fracturing fluid withdrawn the crack or fracture produced in the formation tends to close due to the weight of the overburden. In order to keep the fracture open, a granular solid propping material such as sand is usually suspended in the fracturing fluid. The granular solids upon being carried into the fracture act as props and hold open the fracture after the injection pressure is released. The amount of propping agent is important to the success of the fracturing operation and it is recognized that in certain earth formations, particularly soft unconsolidated earth formations, it is desirable to employ relatively large amounts of propping agent. However, the amount of propping material which can be injected into the well with the fracturing fluid is governed by the capacity of the high pressure pumps which are utilized to pump the fracturing mixture into the well. Frequently, the pumping equipment available for a fracturing operation severely limits the proportion of propping agent which can be employed and results in the fracturing operation achieving less than maximum success.

The present invention provides a method and apparatus for hydraulically fracturing earth formations with a fracturing fluid containing a desired high ratio of granular propping material. More specifically, the present invention provides a method and apparatus for hydraulically fracturing an earth formation with a fracturing mixture comprising a fracturing fluid and a granular propping material wherein the proportion of granular material in the fracturing mixture is substantially increased subsequent to the introduction of the mixture into the well.

In accordance with the invention, after the drilling operations have been completed a well screen is positioned within the well cavity above the zone to be fractured. A discharge line connects with the well screen, the interior of which is in fluid communication with the well cavity. A fracturing mixture comprising a fracturing liquid and a granular propping material is injected under pressure into the well around the well screen. The amount of granular material employed initially in the fracturing mixture is such to permit to the use of available pump equipment for injection of the mixture into the well. The amount of propping agent employed in actual practice utilizing conventional high pressure pump equipment is, in general, on the order of about 1–4 pounds of propping agent per gallon of fracturing fluid. With the present invention, the amount of propping material in the fracturing mixture which is displaced into the formation fracturing mixture which is displaced and may be for example on the order of about 8 pounds or more of propping material per gallon of fracturing fluid.

As the fracturing mixture circulates down the well cavity around the well screen, a part of the fracturing fluid passes through the screen and is withdrawn from the well at a controlled rate. The well screen holds back the granular propping material from which the liquid is withdrawn thereby increasing within the well the effective concentration of propping material in the fracturing fluid. When the pressure exerted by the fracturing mixture is sufficient to overcome the overburden pressure, a fracture or rupture occurs in the formation and the fracturing mixture is forced into the induced fracture. Upon release of the injection pressure and withdrawal of the fracturing fluid, the granular propping material in the desired high concentration is deposited within the induced fracture to hold apart the walls of the fracture thereby maintaining a permeable flow channel and facilitating fluid flow either out of or into the formation.

The fluid employed to fracture the formation and to carry the granular propping material into the fracture can be any of the conventional fracturing fluids which have suitable low-penetrating characteristics. These fluids for the most part, comprise hydrocarbon gels obtained by dispersing a suitable gelling agent in a hydrocarbon oil such as gasoline, kerosene or crude oil. Commonly employed gelling agents include aluminum naphthenate and mixtures thereof with aluminum oleate, hydroxy aluminum soaps of fatty acids, aluminum and other metal soaps of the various fatty acids derived from coconut oil, peanut oil and the like. Aqueous fracturing fluids which may or may not contain a thickening agent such as a natural gum, as for example, Karaya, Batu or Guar gum, and will allow the build up of pressures sufficient to fracture the formation can also be employed.

The propping materials employed in the method of the present invention can be any of the granular materials employed in the art as props and include for example, ceramic particles, metal particles, crushed rock, wood chips and the like. Sand because of its cheapness and general availability is a preferred propping material. The particle size of the propping material can range from those small enough to pass through a 4 standard mesh sieve to those just large enough to be retained on a 100 standard mesh sieve. Sand having a particle size within the range of about 10 mesh to 40 mesh is preferred.

The invention is further described with reference to the accompanying drawings wherein:

FIGURE 1 is a diagramamtic view partly in vertical section showing a preferred apparatus by means of which the invention may be carried out.

FIGURE 2 is an enlarged view in vertical section of the upper part of the apparatus of FIGURE 1 without the well head equipment.

FIGURE 3 is a modified form of apparatus which can be employed in carrying out the invention.

Referring to FIGURE 1, the borehole 10 is shown as being provided with a casing 11 held in place by cement 12. Perforations 13 are provided in casing 11 adjacent producing stratum 14. Removable casing head 15 which is provided with openings 16 and 17 closes the upper end of the cavity and permits the build up of pressure within the well. Flow line connection 18 extends through opening 16 and connects with line 19 through which the fracturing mixture is introduced to the well. Pump 20 is utilized to pump the fracturing mixture from blender 21 through line 19 into the well. A supply of granular propping material is delivered to blender 21 through line 22 from a source of supply not shown. The low-penetrating fracturing liquid is delivered from reservoir 23 to the blender 21 through line 24.

Suspended from the casing head 15 is well screen 25 having a reduced neck portion 26 which is received in opening 17 in the casing head and connects with discharge line 28. A valve 29 in line 28 controls the rate at which the solids-free fracturing fluid flows from the well which is under injection pressure to reservoir 23 for recycle to the well. Pump 30 is a stand by pump so that the flow of fracturing fluid through line 28 can be reversed in the event that it is desired to do so for the purpose of removing particles of the propping agent from the perforations in screen 25. Pump 30 withdraws fracturing fluid from reservoir 23 through line 43 and discharges into line 28 during which time valve 29 is closed.

In the form of apparatus shown in FIGURES 1 and 2, the screen 25 is positioned centrally of casing 11 in the upper part of the well cavity 31. The well screen is of such size as compared to the inside diameter of the well casing that there will be a small annular space between them through which the injected fracturing mixture passes. Because of the reduced size of this annular passage, the fracturing mixture flows through this space at a relatively high velocity and effectively prevents an undesired accumulation of granular particles around the screen. Preferably, the well screen is of a size to occupy from about 60 to 80 percent of the diameter of the well cavity. A distinct advantage of this arrangement is that the perforations in the well screen are maintained free of granular particles thereby preventing plugging of the screen and permitting unrestricted flow of the fracturing liquid through the screen and from the well at an accurately controlled rate.

In FIGURE 3, a modified form of apparatus for carrying out the invention is shown. Thus, perforated liner 32 attached to the end of tubing 33 is run into the well through casing head 34. Pump 44 is utilized to pump a fracturing fluid containing a granular propping material from blender 45 through line 35, valve 36, and through liner 32 into the well cavity. A supply of granular propping material is delivered to blender 45 through line 46 from a source of supply not shown. The low-penetrating fracturing liquid is delivered from fracturing fluid reservoir 47 to the blender 45 through line 48. A second perforated liner 37 having a closed lower end is positioned within the upper part of the well cavity above the zone to be fractured to serve as the discharge outlet for withdrawing a portion of the fracturing fluid. The perforations 38 in liner 37 are sufficiently small to hold back the granular particles of propping material while permitting passage of the fracturing liquid which is withdrawn from the well through line 39 with which liner 37 connects. Valve 40 controls the rate at which solids-free fracturing liquid is withdrawn from the well enroute to reservoir 47. Pump 41 is a stand by pump so that the flow of fracturing fluid through line 39 can be reversed in the event that it is desirable to do so for the purpose of removing particles of the propping agent from the perforations 38 in screen 37. Pump 41 withdraws fracturing fluid from reservoir 47 through line 42 and discharges into line 39 during which time valve 40 is closed.

It will be understood that the present invention does not require the use of any particlar arrangement of apparatus at the well head, but rather with the present invention any arrangement of apparatus can be employed at the well head which will serve to inject the fracturing mixture into the well and to withdraw the fracturing liquid from the well at a controlled rate.

The manner of carrying out the invention will be described with reference to the arrangement of apparatus shown in FIGURES 1 and 2. Thus, a granular solid propping material such as sand preferably of large particle size such as for example about 4 to 6 mesh, is transferred from a supply source through line 22 to blender 21 wherein it is mixed with a suitable fracturing fluid having the desired low-penetrating characteristics. The granular material is mixed with a fracturing fluid at a controlled rate to produce a fracturing mixture which can be pumped into the well with available pump equipment. From the blender 21 the fracturing mixture is transferred by means of pump 20 via line 19 through flow connection 18 into the well cavity. The fracturing mixture circulates down the well through the annular space between well screen 25 and casing 11. The perforations in screen 25 are sufficiently small to hold back even the smallest particles of the propping material while permitting the low-penetrating liquid to pass through and be withdrawn from the well. The fracturing fluid substantially free of granular material flows from the well by the pressure within the well cavity through line 28 to fracturing fluid reservoir 23 for reuse. Valve 29 controls the rate of withdrawal of the fracturing fluid from the well which in turn determines the increase in concentration of the propping material in the fracturing fluid within the well. Thus, for example, by withdrawing the low-penetrating fracturing fluid from the well cavity at a rate one-half that at which the fracturing mixture is injected into the well, the concentration of propping material in the fracturing fluid remaining within the well is doubled. The exact rate at which to withdraw the fracturing fluid in order to obtain a desired increase in concentration of propping material in the fracturing fluid within the well can be routinely determined. It is, of course, obvious that the rate of withdrawal of the fracturing fluid from the well is less than the rate of injection of the fracturing mixture in order to permit building pressures sufficient to fracture the formation. The rate of withdrawal of the solids-free fracturing fluid is maintained at the desired rate as the fracturing mixture is injected into the well. When the hydraulic pressure of the fracturing mixture within the well exceeds the weight of the overburden of the earth per unit area thereof, the formation fractures or ruptures. The fracturing mixture containing the desired ratio of granular material is forced into the induced fracture wherein upon release of the hydraulic pressure it is deposited to hold apart the separated earth layers and to form a highly permeable flow channel for the well fluids.

From the foregoing description, it is apparent that the present invention makes it possible to hydraulically fracture an earth formation utilizing a high concentration of propping material in the fracturing fluid. The invention therefore is particularly advantageous for carrying out hydraulic fracturing operations in soft, unconsolidated earth formations in which the use of a high proportion of propping material is necessary for maximum success. Moreover, the present invention permits the desired high concentration of propping agent to be employed in the fracturing operation with the use at the well head of conventional pumping equipment.

The method of the invention can be utilized in cased or uncased wells producing oil, gas or water as well as in secondary recovery operations employing gas- or water-drive where it is desired to improve the injectivity index of the formation.

Those modifications and variations which fall within the spirit of the invention and the scope of the appended claims are to be considered part of the invention.

I claim:

1. A method for increasing the productivity of an earth formation penetrated by a well bore which comprises positioning a well screen within the upper part of said well bore above the zone to be fractured, the interior of said well screen being in fluid communication with the provide a small annular space around the periphery of well cavity, said well screen being slightly smaller in diameter than the well cavity in which it is positioned to the screen, introducing into the annular space surrounding said screen a fracturing mixture comprising a fracturing fluid and a granular propping material, withdrawing through said screen and from the well at a controlled rate less than the rate of injection of the fracturing mixture a portion of said fracturing fluid substantially free of granular propping material thereby increasing the concentration of granular material in the fracturing fluid remaining within the well, exerting a sufficient pressure on the resultant fracturing fluid having a high concentration of granular propping material suspended therein within the well to fracture the formation and to force some of said fracturing fluid having a high concentration of granular propping material suspended therein into the fracture.

2. A method for fracturing a subsurface formation penetrated by a well and propping the fracture open which comprises injecting a fracturing liquid having particles of a granular propping material suspended therein into the upper part of the borehole of the well, passing a portion of the fracturing liquid through a screen in the upper part of the borehole and discharging said portion from the well whereby a fracturing mixture comprising the fracturing liquid having a high concentration of granular propping material suspended therein remains within the well, and continuing the injection of the fracturing liquid with the granular propping material suspended therein into the well and the withdrawal of a portion of the fracturing liquid through a screen to displace fracturing mixture having a high concentration of granular propping material suspended therein downwardly through the borehole of the well to the formation to be fractured while applying a pressure to the fracturing mixture adequate to fracture the formation and displace the fracturing mixture into the fracture whereby the granular propping material props the fracture open.

References Cited in the file of this patent
UNITED STATES PATENTS

| | | |
|---|---|---|
| 2,418,343 | Garol | Apr. 1, 1947 |
| 2,693,854 | Abendroth | Nov. 9, 1954 |
| 2,814,347 | MacKnight | Nov. 26, 1957 |
| 2,905,245 | De Priester | Sept. 22, 1959 |

UNITED STATES PATENT OFFICE
CERTIFICATE OF CORRECTION

Patent No. 3,077,930                          February 19, 1963

Joseph K. Beckett

It is hereby certified that error appears in the above numbered patent requiring correction and that the said Letters Patent should read as corrected below.

Column 1, line 62, strike out "to", second occurrence, lines 69 and 70, strike out "fracturing mixture which is displaced" and insert instead -- fracture can be significantly increased --; column 4, line 64, strike out "provide a small annular space around the periphery of" and insert the same after "to", in line 66, same column 4.

Signed and sealed this 24th day of September 1963.

(SEAL)
Attest:

ERNEST W. SWIDER                              DAVID L. LADD
Attesting Officer                                 Commissioner of Patents